US012720427B2

(12) United States Patent
Lee et al.

(10) Patent No.: US 12,720,427 B2
(45) Date of Patent: Aug. 25, 2026

(54) METHOD AND APPARATUS FOR CELL RESELECTION IN WIRELESS COMMUNICATION SYSTEM

(71) Applicant: LG ELECTRONICS INC., Seoul (KR)

(72) Inventors: Oanyong Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 18/289,861

(22) PCT Filed: Mar. 2, 2022

(86) PCT No.: PCT/KR2022/002939
§ 371 (c)(1),
(2) Date: Nov. 7, 2023

(87) PCT Pub. No.: WO2022/239941
PCT Pub. Date: Nov. 17, 2022

(65) Prior Publication Data

US 2024/0244517 A1 Jul. 18, 2024

(30) Foreign Application Priority Data

May 10, 2021 (KR) ........................ 10-2021-0060162

(51) Int. Cl.
*H04W 48/20* (2009.01)

(52) U.S. Cl.
CPC .................................. *H04W 48/20* (2013.01)

(58) Field of Classification Search
CPC ....... H04W 48/20; H04W 84/06; Y02D 30/70
See application file for complete search history.

(56) References Cited

U.S. PATENT DOCUMENTS

2016/0255565 A1 9/2016 Kim et al.
2017/0339650 A1* 11/2017 Jung .................... H04W 76/14
2021/0045026 A1 2/2021 Lee et al.

FOREIGN PATENT DOCUMENTS

WO 2020-165681 8/2020

OTHER PUBLICATIONS

Xiaomi, Enhancements on cell selection/reselection for earth moving and fixed beams, Jan. 15, 2021, 3GPP TSG RAN WG2 #113, R2-2100811,. (Year: 2021).*

(Continued)

*Primary Examiner* — Said M Elnoubi
(74) *Attorney, Agent, or Firm* — LEE, HONG, DEGERMAN, KANG & WAIMEY

(57) ABSTRACT

The present disclosure relates to a cell reselection in wireless communications. According to an embodiment of the present disclosure, a method performed by a user equipment (UE) in a wireless communication system comprises: receiving, from a network, location information comprising a location point for each time point related to each of neighbor cells and a reference distance related to each of the neighbor cells; determining a distance to each of the neighbor cells from the UE as a distance between the location point and the UE; determining a ratio of the distance to the reference distance for each of the neighbor cells; selecting a cell based on the determined ratio among at least one of the neighbor cells; and performing a cell reselection to the selected cell.

11 Claims, 15 Drawing Sheets

(56) References Cited

OTHER PUBLICATIONS

PCT International Application No. PCT/KR2022/002939, International Search Report dated Jun. 8, 2022, 3 pages.
Xiaomi, "Discussion on mobility management in NTN," R2-2100806, 3GPP TSG RAN WG2 #113, e-Meeting, Jan. 2021, 10 pages.
Sony, "Mobility management in NTN," R2-2100915, 3GPP TSG-RAN WG2 Meeting #113 electronic, Online, Jan. 2021, 4 pages.
Oppo, "Discussion on mobility management for connected mode UE in NTN," R2-2100164, 3GPP TSG-RAN WG2 Meeting #113-e, Electronic, Jan. 2021, 6 pages.
European Patent Office Application Serial No. 22807590.9 Search Report dated Oct. 4, 2024, 14 pages.
Xiaomi, "Enhancements on cell selection/reselection for earth moving and fixed beams," R2-2100811, 3GPP TSG RAN WG2 #113, e-Meeting, Jan. 2021, 3 pages.
Xiaomi, "Control Plane for Idle/Inactive mode UE," R2-2007175, 3GPP TSG RAN WG2 #111, e-Meeting, Aug. 2020, 4 pages.
Ericsson, "Connected mode aspects for NTN," R2-2103751, 3GPP TSG-RAN WG2 Meeting #113 bis electronic, Online, Apr. 2021, 18 pages.
Huawei et al., "Discussion on cell measurement for mobility management in NTN," R1-1904002, 3GPP TSG RAN WG1 Meeting #96bis, Apr. 2019, 4 pages.

* cited by examiner

FIG. 1

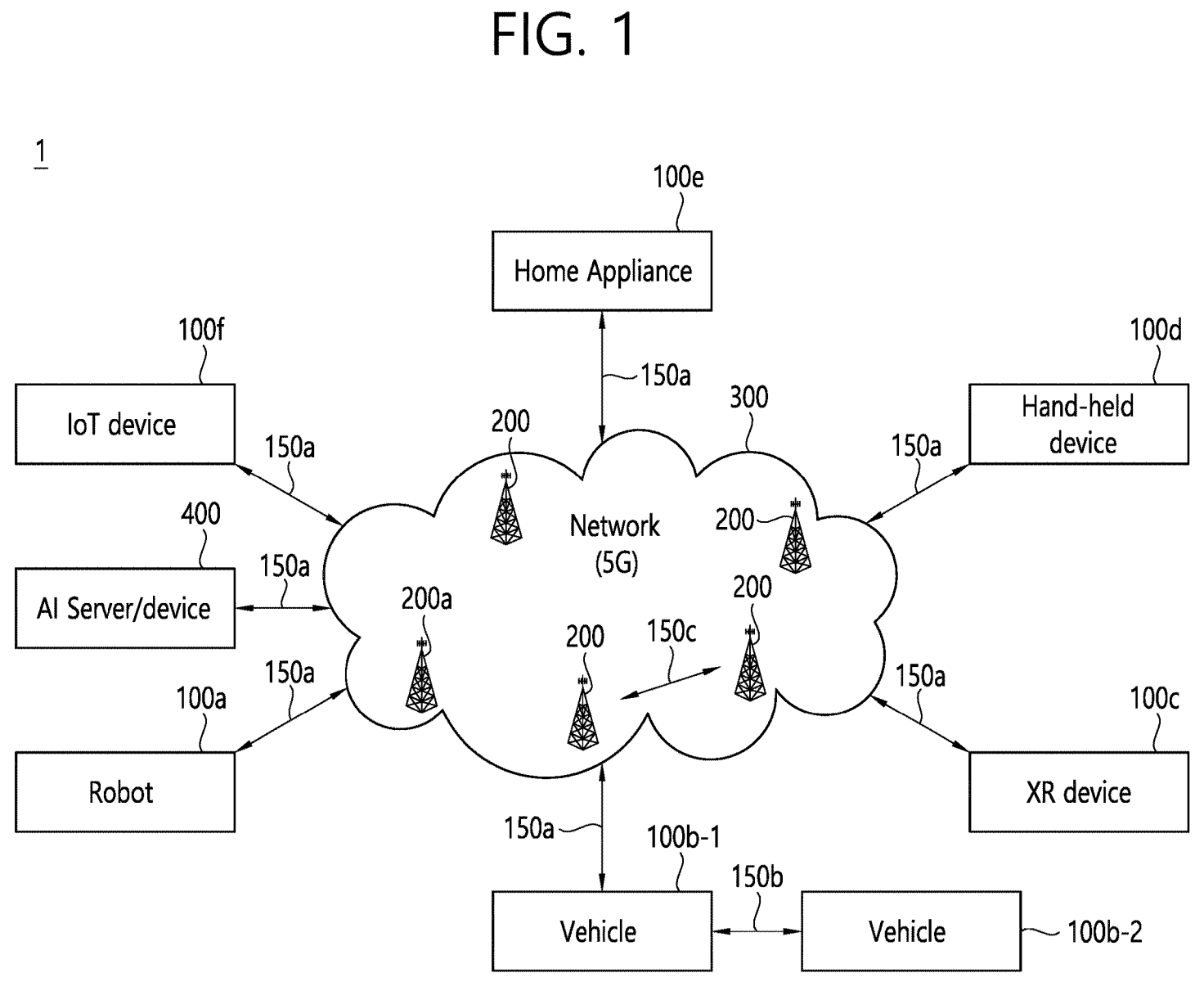

1
100d Hand-held device
100c XR device
100b-2 Vehicle
150a
150a
300
200
200
150b
100e Home Appliance
150a
Network (5G)
150c
100b-1 Vehicle
200
150a
200
200a
150a
150a
150a
100f IoT device
400 AI Server/device
100a Robot

FIG. 3

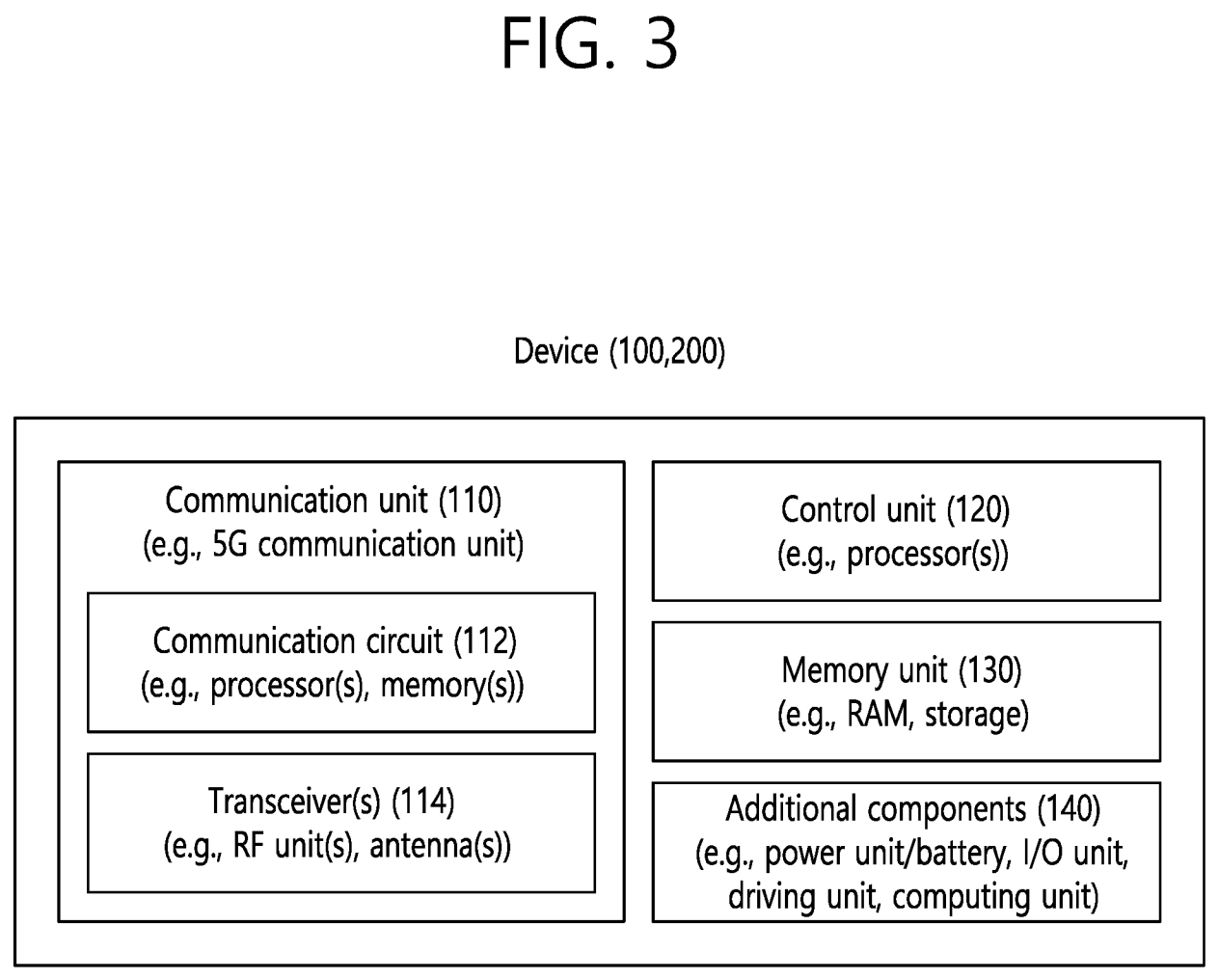

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit, driving unit, computing unit)

METHOD AND APPARATUS FOR CELL RESELECTION IN WIRELESS COMMUNICATION SYSTEM

CROSS-REFERENCE TO RELATED APPLICATIONS

This application is the National Stage filing under 35 U.S.C. 371 of International Application No. PCT/KR2022/002939, filed on Mar. 2, 2022, which claims the benefit of earlier filing date and right of priority to Korean Application No. 10-2021-0060162, filed on May 10, 2021, the contents of which are all hereby incorporated by reference herein in their entireties.

TECHNICAL FIELD

The present disclosure relates to a cell reselection in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A user equipment (UE) in a wireless communication may perform a cell reselection based on a cell reselection criteria. For example, according to the cell reselection criteria, the UE may select a frequency having the highest priority, and select the highest ranked cell for the cell reselection among cells in the selected frequency. However, in a non-terrestrial network (NTN), the cell reselection criteria may need to be adjusted.

SUMMARY

An aspect of the present disclosure is to provide method and apparatus for a cell reselection in a wireless communication system.

Another aspect of the present disclosure is to provide method and apparatus for a cell reselection of NTN cell in a wireless communication system.

According to an embodiment of the present disclosure, a method performed by a user equipment (UE) in a wireless communication system comprises: receiving, from a network, location information comprising a location point for each time point related to each of neighbor cells and a reference distance related to each of the neighbor cells: determining a distance to each of the neighbor cells from the UE as a distance between the location point and the UE: determining a ratio of the distance to the reference distance for each of the neighbor cells: selecting a cell based on the determined ratio among at least one of the neighbor cells: and performing a cell reselection to the selected cell.

According to an embodiment of the present disclosure, a user equipment (UE) configured to operate in a wireless communication system comprises: at least one transceiver: at least processor: and at least one computer memory operably connectable to the at least one processor and storing instructions that, based on being executed by the at least one processor, perform operations comprising: receiving, from a network, location information comprising a location point for each time point related to each of neighbor cells and a reference distance related to each of the neighbor cells: determining a distance to each of the neighbor cells from the UE as a distance between the location point and the UE: determining a ratio of the distance to the reference distance for each of the neighbor cells: selecting a cell based on the determined ratio among at least one of the neighbor cells: and performing a cell reselection to the selected cell.

According to an embodiment of the present disclosure, at least one computer readable medium (CRM) stores instructions that, based on being executed by at least one processor, perform operations comprising: receiving, from a network, location information comprising a location point for each time point related to each of neighbor cells and a reference distance related to each of the neighbor cells: determining a distance to each of the neighbor cells from the UE as a distance between the location point and the UE: determining a ratio of the distance to the reference distance for each of the neighbor cells: selecting a cell based on the determined ratio among at least one of the neighbor cells: and performing a cell reselection to the selected cell.

According to an embodiment of the present disclosure, an apparatus for configured to operate in a wireless communication system comprises: at least processor; and at least one computer memory operably connectable to the at least one processor, wherein the at least one processor is configured to perform operations comprising: receiving, from a network, location information comprising a location point for each time point related to each of neighbor cells and a reference distance related to each of the neighbor cells: determining a distance to each of the neighbor cells from the UE as a distance between the location point and the UE: determining a ratio of the distance to the reference distance for each of the neighbor cells: selecting a cell based on the determined ratio among at least one of the neighbor cells: and performing a cell reselection to the selected cell.

According to an embodiment of the present disclosure, a method performed by a base station (BS) configured to operate in a wireless communication system comprises: transmitting, to a user equipment (UE), one or more synchronization signal/physical broadcast channel (SS/PBCH) blocks: performing a random access procedure with the UE: identifying neighbor cells which are candidates for a cell reselection: and transmitting, to the UE, location information comprising a location point for each time point related to each of the neighbor cells and a reference distance related to each of the neighbor cells, wherein a distance between the location point and the UE is determined as a distance to each of the neighbor cells from the UE, and wherein a cell for the cell reselection is selected based on a ratio of the distance to the reference distance for each of the neighbor cells.

According to an embodiment of the present disclosure, a base station (BS) configured to operate in a wireless communication system comprises: at least one transceiver: at least processor: and at least one computer memory operably connectable to the at least one processor and storing instructions that, based on being executed by the at least one processor, perform operations comprising: transmitting, to a user equipment (UE), one or more synchronization signal/physical broadcast channel (SS/PBCH) blocks: performing a random access procedure with the UE: identifying neighbor cells which are candidates for a cell reselection: and transmitting, to the UE, location information comprising a location point for each time point related to each of the neighbor cells and a reference distance related to each of the neighbor cells, wherein a distance between the location point and the UE is determined as a distance to each of the neighbor cells from the UE, and wherein a cell for the cell reselection is selected based on a ratio of the distance to the reference distance for each of the neighbor cells.

The present disclosure can have various advantageous effects.

For example, the UE can expect which cell can provide the longest service time based on provided time condition or location condition. If the longer service time is provided, the UE can avoid unnecessary mobility.

For example, when time condition/location condition is provided to UE, the UE can perform a cell reselection/mobility to a cell in which a service is provided to the UE longest.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 3 shows an example of a wireless device to which implementations of the present disclosure is applied.

DETAILED DESCRIPTION

Figure 2:
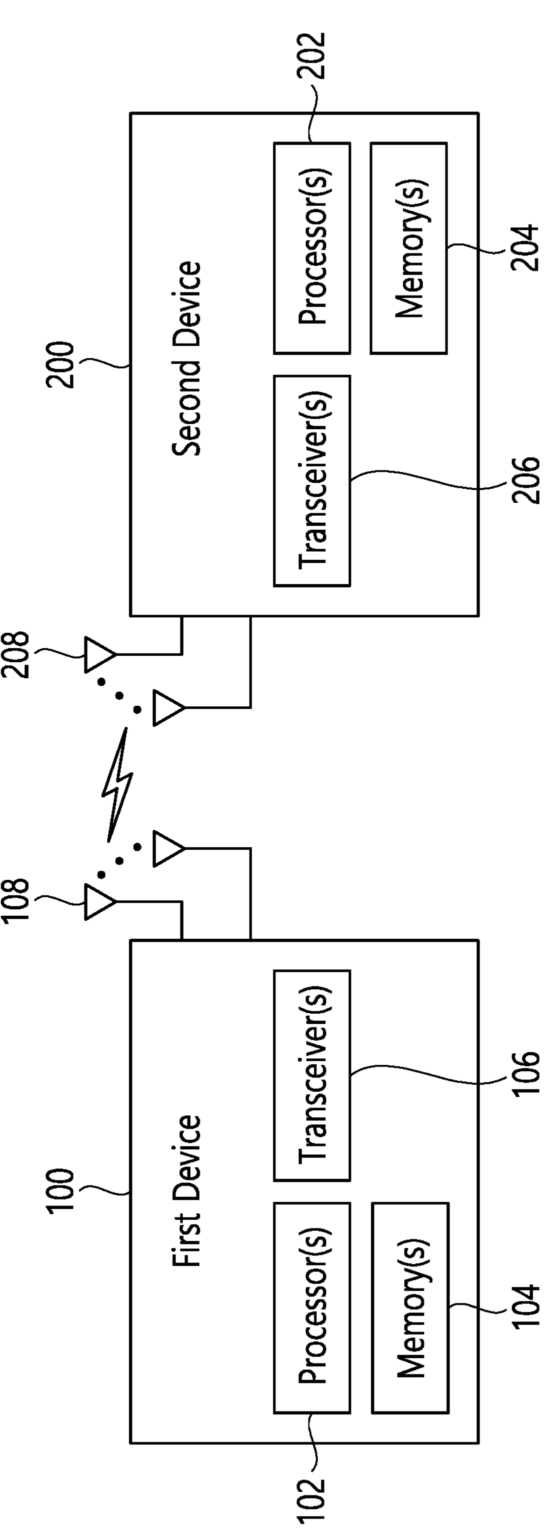
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IOT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrow band internet-of-things (NB-IOT) technology for low-power communication as well as LTE, NR and 6G. For example, NB-IOT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory (s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory (s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory (s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
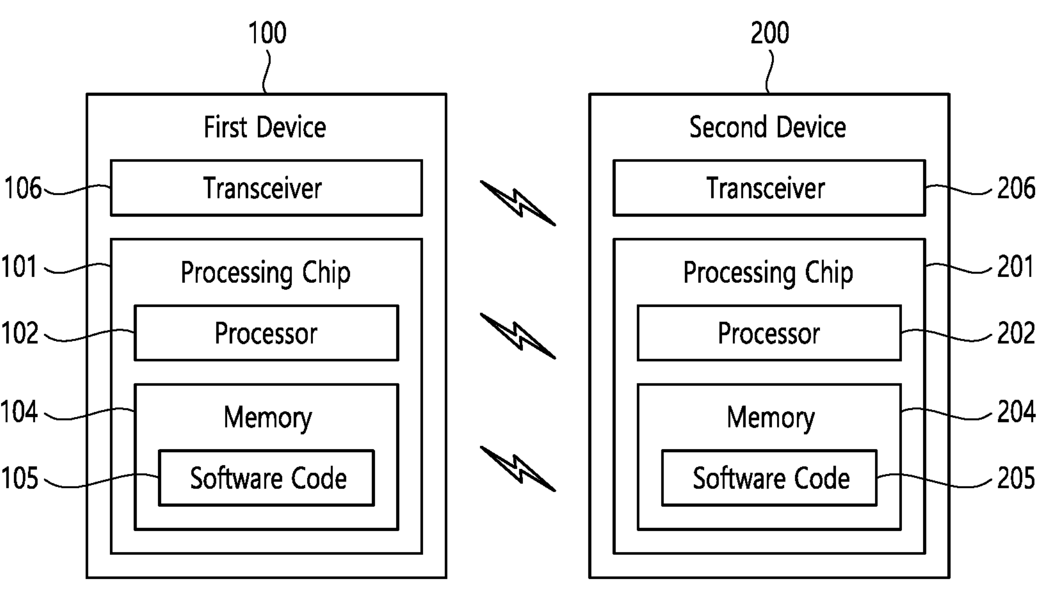
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure.

For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
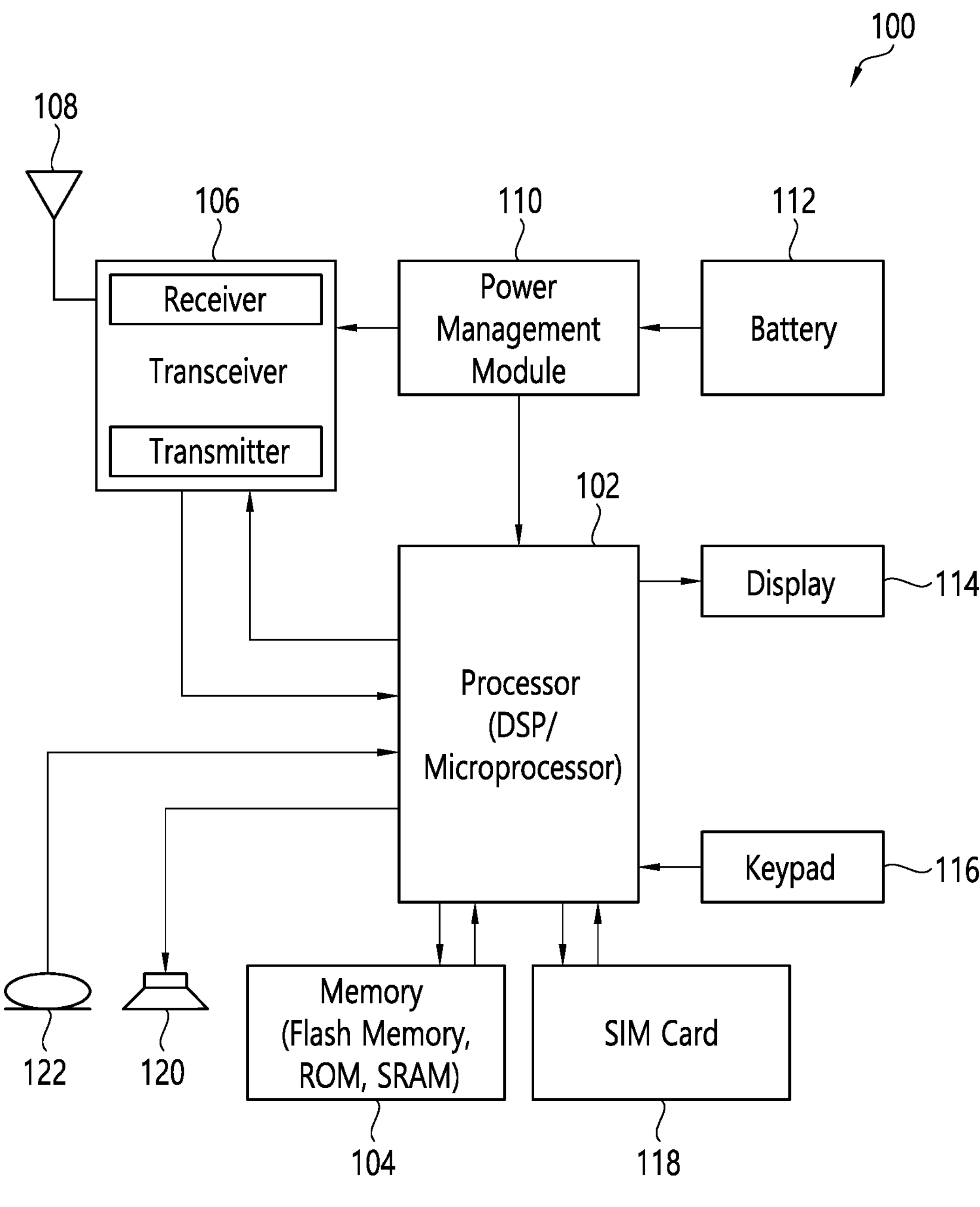
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122. The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
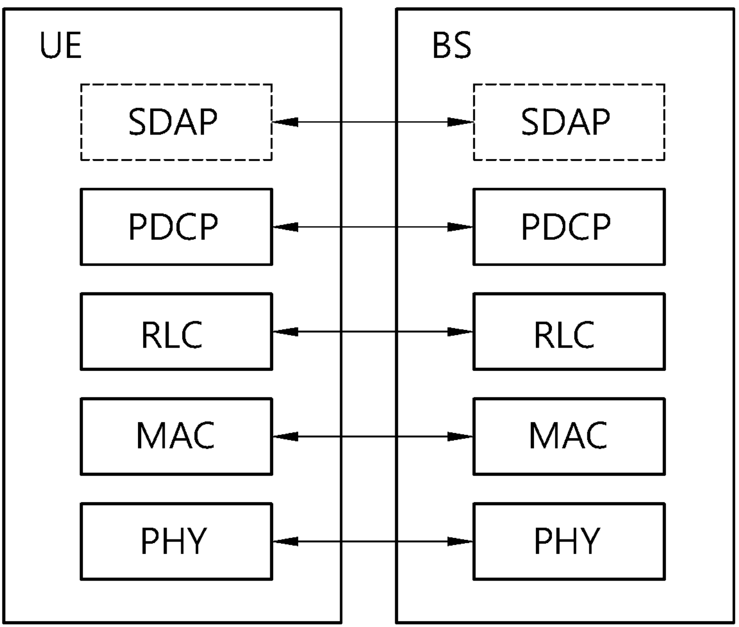
FIGS. 6 and 7 show an example of protocol stacks in a 3GPP based wireless communication system to which implementations of the present disclosure is applied.
Figure 7:
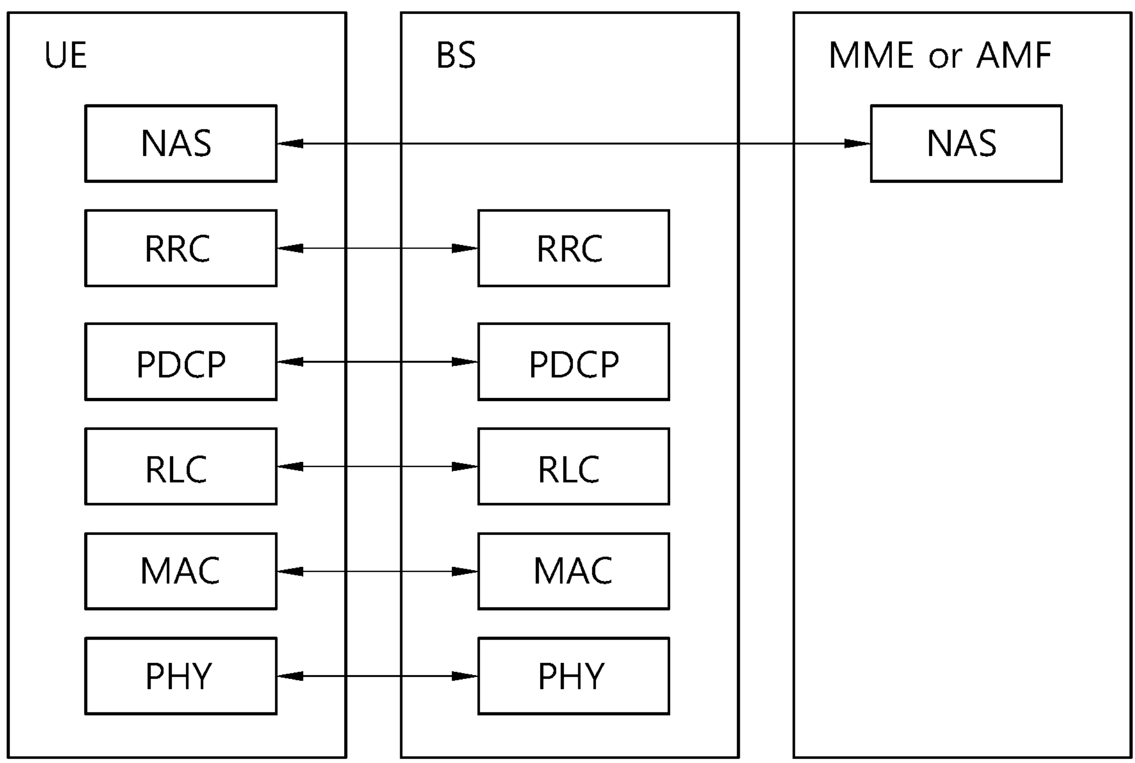

FIGS. 6 and 7 show an example of protocol stacks in a 3GPP based wireless communication system to which implementations of the present disclosure is applied.

In particular. FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer). Layer 2. Layer 3 (e.g., an RRC layer), and a non-access stratum (NAS) layer. Layer 1. Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QOS) flows.

In the 3GPP NR system, the main services and functions of the MAC sublayer include: mapping between logical channels and transport channels: multiplexing/de-multiplexing of MAC SDUs belonging to one or different logical channels into/from transport blocks (TB) delivered to/from the physical layer on transport channels: scheduling information reporting: error correction through hybrid automatic repeat request (HARQ) (one HARQ entity per cell in case of carrier aggregation (CA)): priority handling between UEs by means of dynamic scheduling: priority handling between logical channels of one UE by means of logical channel prioritization: padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH): BCCH can be mapped to downlink shared channel (DL-SCH): PCCH can be mapped to paging channel (PCH): CCCH can be mapped to DL-SCH: DCCH can be mapped to DL-SCH: and DTCH can be mapped to DL-SCH. In uplink, the following connections between logical channels and transport channels exist: CCCH can be mapped to uplink shared channel (UL-SCH): DCCH can be mapped to UL-SCH: and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs: sequence numbering independent of the one in PDCP (UM and AM): error correction through ARQ (AM only): segmentation (AM and UM) and re-segmentation (AM only) of RLC SDUs: reassembly of SDU (AM and UM): duplicate detection (AM only): RLC SDU discard (AM and UM); RLC re-establishment: protocol error detection (AM only).

In the 3GPP NR system, the main services and functions of the PDCP sublayer for the user plane include: sequence numbering: header compression and decompression using robust header compression (ROHC): transfer of user data: reordering and duplicate detection: in-order delivery: PDCP PDU routing (in case of split bearers): retransmission of PDCP SDUs: ciphering, deciphering and integrity protection: PDCP SDU discard: PDCP re-establishment and data recovery for RLC AM: PDCP status reporting for RLC AM: duplication of PDCP PDUs and duplicate discard indication to lower layers. The main services and functions of the PDCP sublayer for the control plane include: sequence numbering: ciphering, deciphering and integrity protection: transfer of control plane data: reordering and duplicate detection: in-order delivery: duplication of PDCP PDUs and duplicate discard indication to lower layers.

In the 3GPP NR system, the main services and functions of SDAP include: mapping between a QoS flow and a data radio bearer: marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS: paging initiated by 5GC or NG-RAN: establishment, maintenance and release of an RRC connection between the UE and NG-RAN: security functions including key management: establishment, configuration, maintenance and release of signaling radio bearers (SRBs) and data radio bearers (DRBs): mobility functions (including: handover and context transfer. UE cell selection and reselection and control of cell selection and reselection, inter-RAT mobility): QoS management functions: UE measurement reporting and control of the reporting: detection of and recovery from radio link failure: NAS message transfer to/from NAS from/to UE.

Figure 8:
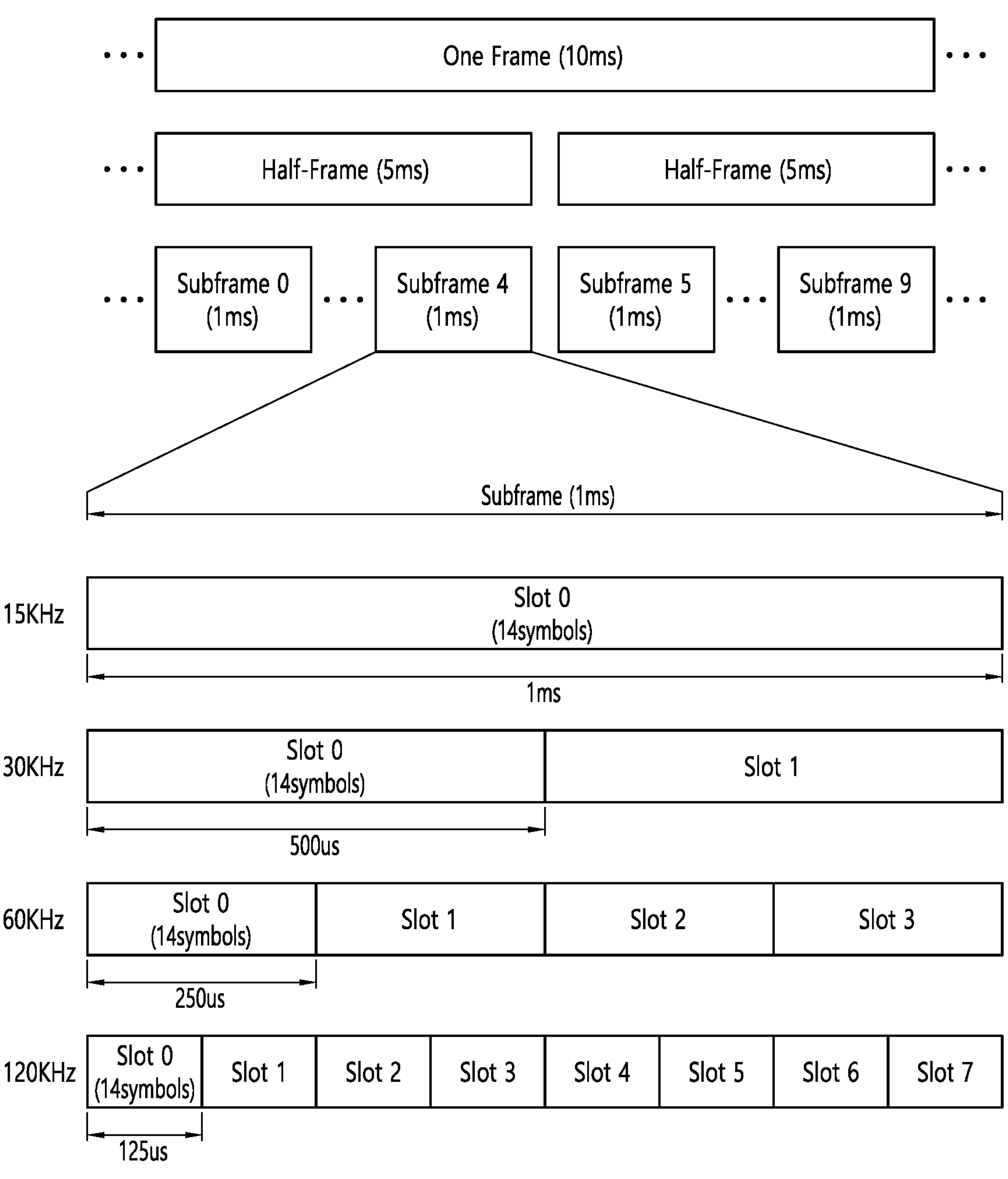
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system. OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols). SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f=2^{\mu}*15$ KHz.

Table 1 shows the number of OFDM symbols per slot $N^{slot}_{symb}$, the number of slots per frame $N^{frame,\mu}_{slot}$, and the number of slots per subframe $N^{subframe,\mu}_{slot}$ for the normal CP, according to the subcarrier spacing $\beta f=2^{\mu}*15$ KHz.

TABLE 1

| | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |

TABLE 1-continued

| | $N^{slot}_{symb}$ | $N^{frame,u}_{slot}$ | $N^{subframe,u}_{slot}$ |
|---|---|---|---|
| 3 | 14 | 80 | 8 |
| 4 | 14 | 160 | 16 |

Table 2 shows the number of OFDM symbols per slot $N^{slot}_{symb}$, the number of slots per frame $N^{frame,\mu}_{slot}$, and the number of slots per subframe $N^{subframe,\mu}_{slot}$ for the extended CP, according to the subcarrier spacing $\beta f = 2\mu * 15$ KHz.

TABLE 2

| | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,\mu}_{grid,x} * N^{RB}_{sc}$ subcarriers and $N^{subframe,\mu}_{symb}$ OFDM symbols is defined, starting at common resource block (CRB) $N^{start,\mu}_{grid}$ indicated by higher-layer signaling (e.g., RRC signaling), where $N^{size,\mu}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N_{RB}^{sc}$ is 12 generally. There is one resource grid for a given antenna port p, subcarrier spacing configuration u, and transmission direction (DL or UL). The carrier bandwidth $N^{size,\mu}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i-1}$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP\mu i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHZ, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
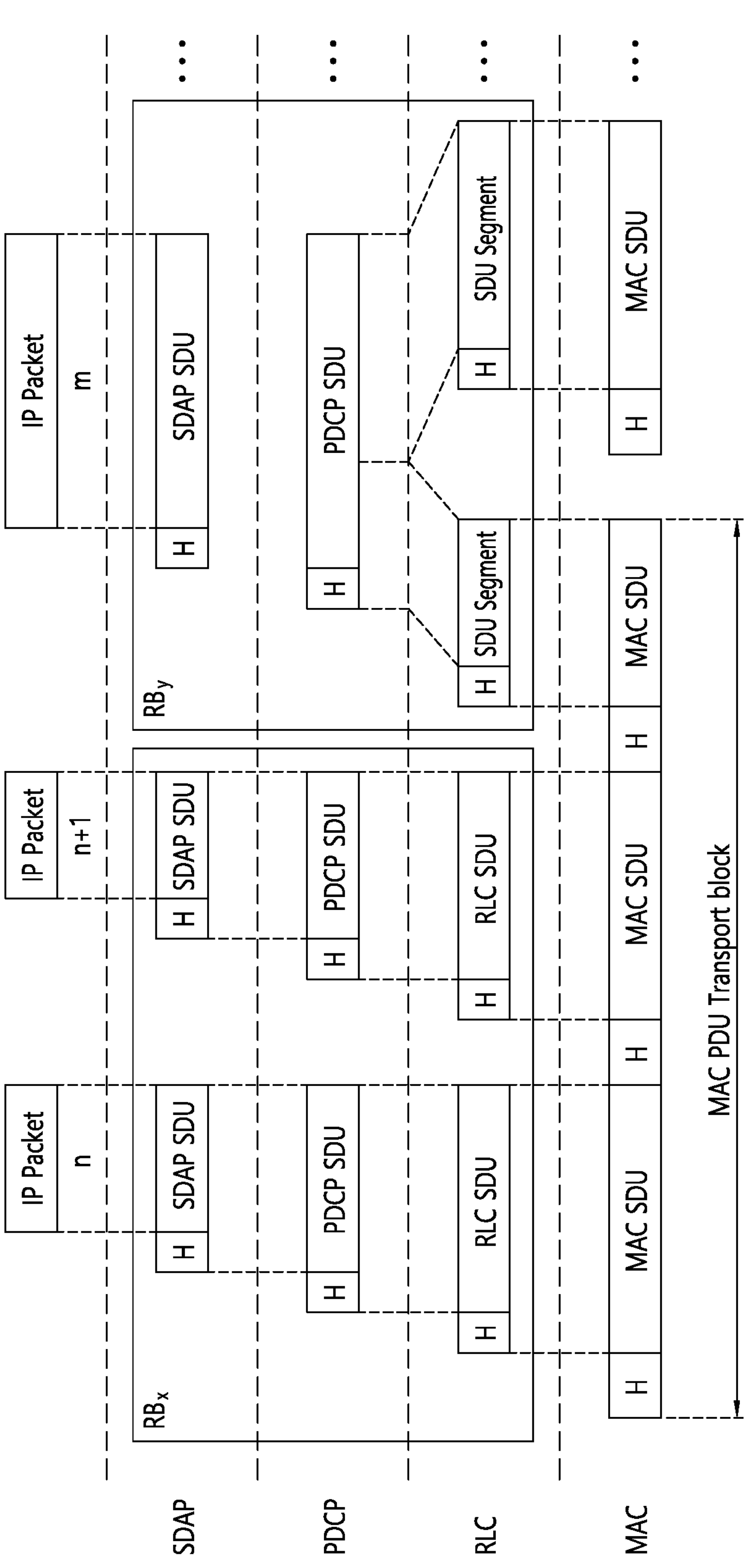
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Hereinafter, cell reselection evaluation process is described.

Absolute priorities of different NR frequencies or inter-RAT frequencies may be provided to the UE in the system information, in the RRCRelease message, or by inheriting from another RAT at inter-RAT cell (re)selection. In the case of system information, an NR frequency or inter-RAT frequency may be listed without providing a priority (i.e, the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling and deprioritisationReq received in RRCRelease unless specified otherwise. When the UE in camped normally state, has only dedicated priorities other than for the current frequency, the UE shall consider the current frequency to be the lowest priority frequency (i.e. lower than any of the network configured values). If the UE is configured to perform both NR sidelink communication and V2X sidelink communication, the UE may consider the frequency providing both NR sidelink communication configuration and V2X sidelink communication configuration to be the highest priority. If the UE is configured to perform NR sidelink communication and not perform V2X communication, the UE may consider the frequency providing NR sidelink communication configuration to be the highest priority. If the UE is configured to perform V2X sidelink communication and not perform NR sidelink communication, the UE may consider the frequency providing V2X sidelink communication configuration to be the highest priority.

The frequency only providing the anchor frequency configuration should not be prioritized for V2X service during cell reselection.

When UE is configured to perform NR sidelink communication or V2X sidelink communication performs cell reselection, it may consider the frequencies providing the intra-carrier and inter-carrier configuration have equal priority in cell reselection.

The prioritization among the frequencies which UE considers to be the highest priority frequency is left to UE implementation.

The UE is configured to perform V2X sidelink communication or NR sidelink communication, if it has the capability and is authorized for the corresponding sidelink operation.

When UE is configured to perform both NR sidelink communication and V2X sidelink communication, but cannot find a frequency which can provide both NR sidelink communication configuration and V2X sidelink communication configuration, UE may consider the frequency providing either NR sidelink communication configuration or V2X sidelink communication configuration to be the highest priority.

The UE shall only perform cell reselection evaluation for NR frequencies and inter-RAT frequencies that are given in system information and for which the UE has a priority provided.

In case UE receives RRCRelease with deprioritisationReq, UE shall consider current frequency and stored frequencies due to the previously received RRCRelease with deprioritisationReq or all the frequencies of NR to be the lowest priority frequency (i.e. lower than any of the network configured values) while T325 is running irrespective of camped RAT. The UE shall delete the stored deprioritisation request(s) when a PLMN selection or SNPN selection is performed on request by NAS.

UE should search for a higher priority layer for cell reselection as soon as possible after the change of priority.

The UE shall delete priorities provided by dedicated signalling when:

- the UE enters a different RRC state: or
- the optional validity time of dedicated priorities (T320) expires: or
- the UE receives an RRCRelease message with the field cellReselectionPriorities absent: or
- a PLMN selection or SNPN selection is performed on request by NAS.

The UE shall not consider any black listed cells as candidate for cell reselection.

The UE shall consider only the white listed cells, if configured, as candidates for cell reselection.

The UE in RRC_IDLE state shall inherit the priorities provided by dedicated signalling and the remaining validity time (i.e. T320 in NR and E-UTRA), if configured, at inter-RAT cell (re)selection.

The network may assign dedicated cell reselection priorities for frequencies not configured by system information.

If the serving cell fulfils $Srxlev>S_{intraSearchP}$ and $Squal>S_{intraSearchQ}$, the UE may choose not to perform intra-frequency measurements. Otherwise, the UE shall perform intra-frequency measurements.

The UE shall apply the following rules for NR inter-frequencies and inter-RAT frequencies which are indicated in system information and for which the UE has priority;

1) For a NR inter-frequency or inter-RAT frequency with a reselection priority higher than the reselection priority of the current NR frequency, the UE shall perform measurements of higher priority NR inter-frequency or inter-RAT frequencies;

2) For a NR inter-frequency with an equal or lower reselection priority than the reselection priority of the current NR frequency and for inter-RAT frequency with lower reselection priority than the reselection priority of the current NR frequency;

If the serving cell fulfils $Srxlev>S_{nonIntraSearchP}$ and $Squal>S_{nonIntraSearchQ}$, the UE may choose not to perform measurements of NR inter-frequencies or inter-RAT frequency cells of equal or lower priority;

Otherwise, the UE shall perform measurements of NR inter-frequencies or inter-RAT frequency cells of equal or lower priority.

If the UE supports relaxed measurement and relaxedMeasurement is present in SIB2, the UE may further relax the needed measurements.

Hereinafter, cell selection criterion and cell reselection criteria are described.

(1) Cell Selection Criterion

The cell selection criterion S (or, S criterion/criteria) is fulfilled when Srxlev>0) and Squal>0, where $Srxlev=Q_{rxlevmeas}-(Q_{rxlevmin}+Q_{rxlevminoffset})-P_{compensation}-Qoffset_{temp}$—and $Squal=Q_{qualmeas}-(Q_{qualmin}+Q_{qualminoffset})-Qoffset_{temp}$. Table 5 illustrates a definition of each parameter:

TABLE 5

| | |
|---|---|
| Srxlev | Cell selection RX level value (dB) |
| Squal | Cell selection quality value (dB) |
| $Qoffset_{temp}$ | Offset temporarily applied to a cell |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, $Q_{rxlevmin}$ is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else $Q_{rxlevmin}$ is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN. |
| $Q_{qualminoffset}$ | Offset to the signalled $Q_{qualmin}$ taken into account in the Squal evaluation as a result of a periodic search for a higher priority PLMN while camped normally in a VPLMN. |

TABLE 5-continued

| | |
|---|---|
| $P_{compensation}$ | For FR1, if the UE supports the additionalPmax in the NR-NS-PmaxList, if present, in SIB1, SIB2 and SIB4: $\max(P_{EMAX1}-P_{PowerClass}, 0)-(\min(P_{EMAX2}, P_{PowerClass})-\min(P_{EMAX1}, P_{PowerClass}))$ (dB); else: $\max(P_{EMAX1}-P_{PowerClass}, 0)$ (dB) For FR2, $P_{compensation}$ is set to 0. |
| $P_{EMAX1}$, $P_{EMAX2}$ | Maximum TX power level of a UE may use when transmitting on the uplink in the cell (dBm). If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4, else $P_{EMAX1}$ and $P_{EMAX2}$ are obtained from the p-Max and NR-NS-PmaxList respectively in SIB1, SIB2 and SIB4 for normal UL. |
| $P_{PowerClass}$ | Maximum RF output power of the UE (dBm) according to the UE power class. |

The signalled values $Q_{rxlevminoffset}$ and $Q_{qualminoffset}$ are only applied when a cell is evaluated for cell selection as a result of a periodic search for a higher priority PLMN while camped normally in a VPLMN. During this periodic search for higher priority PLMN, the UE may check the S criteria of a cell using parameter values stored from a different cell of this higher priority PLMN.(2) NR Inter-frequency and inter-RAT Cell Reselection criteria If threshServingLowQ is broadcast in system information and more than 1 second has elapsed since the UE camped on the current serving cell, cell reselection to a cell on a higher priority NR frequency or inter-RAT frequency than the serving frequency shall be performed if a cell of a higher priority NR or EUTRAN RAT/frequency fulfils $Squal>Thresh_{X, HighQ}$ during a time interval $Treselection_{RAT}$.

Otherwise, cell reselection to a cell on a higher priority NR frequency or inter-RAT frequency than the serving frequency shall be performed if:

A cell of a higher priority RAT/frequency fulfils $Srxlev>Thresh_{X, HighP}$ during a time interval $Treselection_{RAT}$; and More than 1 second has elapsed since the UE camped on the current serving cell.

Cell reselection to a cell on an equal priority NR frequency shall be based on ranking for intra-frequency cell reselection.

If threshServingLowQ is broadcast in system information and more than 1 second has elapsed since the UE camped on the current serving cell, cell reselection to a cell on a lower priority NR frequency or inter-RAT frequency than the serving frequency shall be performed if the serving cell fulfils $Squal<Thresh_{serving, LowQ}$ and a cell of a lower priority NR or E-UTRAN RAT/frequency fulfils $Squal>Thresh_{X, LowQ}$ during a time interval $Treselection_{RAT}$.

Otherwise, cell reselection to a cell on a lower priority NR frequency or inter-RAT frequency than the serving frequency shall be performed if:

The serving cell fulfils $Srxlev<Thresh_{Serving, LowP}$ and a cell of a lower priority RAT/frequency fulfils $Srxlev>Thresh_{X, LowP}$ during a time interval $Treselection_{RAT}$; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:

If the highest-priority frequency is an NR frequency, the highest ranked cell among the cells on the highest priority frequency(ies);

If the highest-priority frequency is from another RAT, the strongest cell among the cells on the highest priority frequency(ies) meeting the criteria of that RAT.

(3) Intra-Frequency and Equal Priority Inter-Frequency Cell Reselection Criteria The cell ranking criterion $R_s$ for serving cell (i.e., R value for serving cell) is defined by $R_s=Q_{meas,s}+Q_{hyst}-Qoffset_{temp}$. The cell ranking criterion $R_n$ for neighbour cell (i.e., R value for neighbour cell) is defined by $R_n=Q_{meas,n}-Qoffset-Qoffset_{temp}$. Table 6 illustrates a definition of each parameter:

TABLE 6

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero.For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell. |

The $R_s$ may also be referred to as a cell ranking value for a serving cell. The $R_n$ may also be referred to as a cell ranking value for neighbour cell. The UE shall perform ranking of all cells that fulfil the cell selection criterion S.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them.

In all cases, the UE shall reselect the new cell, only if the following conditions are met:

the new cell is better than the serving cell according to the cell reselection criteria specified above during a time interval $Treselection_{RAT}$;

more than 1 second has elapsed since the UE camped on the current serving cell.

If rangeToBestCell is configured but absThreshSS-BlocksConsolidation is not configured on an NR frequency, the UE considers that there is one beam above the threshold for each cell on that frequency.

UE may receive system information including cell reselection parameters via a broadcast signalling from a serving cell. The cell reselection parameters are defined in section 5.2.4.7.0 of 3GPP TS 38.304 V16.4.0.

Hereinafter, conditional mobility is described.

The conditional mobility may comprise i) conditional handover (CHO), ii) conditional PSCell addition, and/or iii) conditional PSCell change. The CHO may also be referred to as conditional PSCell change.

For conditional mobility, a UE may receive mobility commands from a service cell. Each of the mobility commands may comprise information for a mobility to a corresponding target cell. For example, each of the mobility commands may comprise an identity of each of the mobility commands, a mobility condition for the corresponding target cell, and a candidate/target cell configuration for the corresponding target cell.

For example, the mobility condition for a target cell may comprise event A3 condition. The event A3 condition may be related to an offset value and a time-to-trigger (TTT). The event A3 condition for a target cell may be satisfied if a signal quality for the target cell is better than that for the serving cell more than or equal to the offset value.

For example, the mobility condition for a target cell may comprise event A5 condition. The event A5 condition may be related to a serving cell threshold and a target cell threshold. The event A5 condition for a target cell may be satisfied if a signal quality for the target cell is better than the target cell threshold and a signal quality for the serving cell is lower than the serving cell threshold.

The candidate/target cell configuration for the corresponding target cell may comprise an initial access configuration such as a random access configuration (e.g., dedicated random access preamble).

The UE may evaluate a mobility condition for at least one target cell. If a mobility condition for a target cell included in a mobility command is satisfied, the UE may perform a mobility to the target cell by applying the mobility command. For example, the UE may perform a random access to the target cell by applying a target cell configuration in the mobility command.

Hereinafter, non-terrestrial network (NTN) is described.

Figure 10:
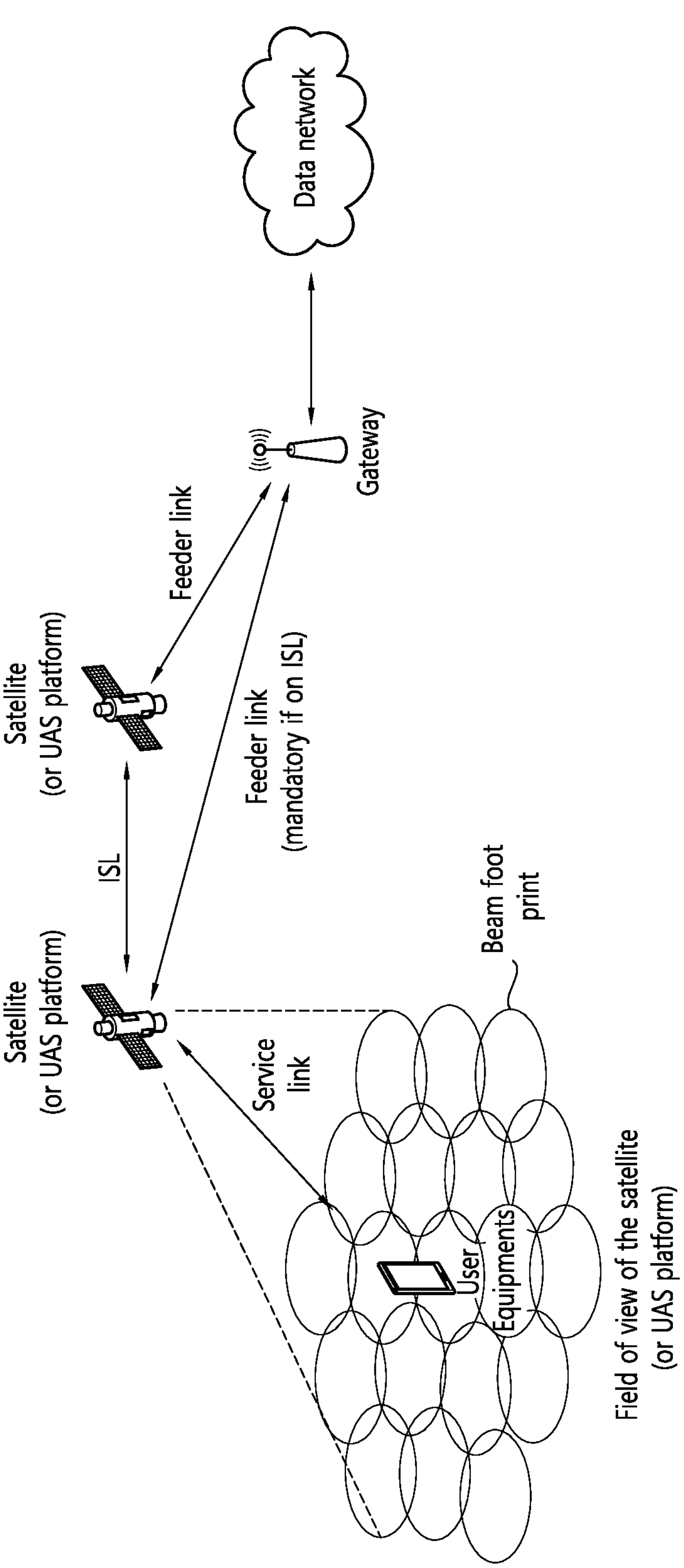
FIG. 10 shows an example of an NTN system to which technical features of the present disclosure can be applied.

FIG. 10 shows an example of an NTN system to which technical features of the present disclosure can be applied.

An NTN may refer to a network, or segment of networks using RF resources on board a satellite (or, unmanned aerial system (UAS) platform). The NTN may provide access to UE.

One or several sat-gateways may connect the NTN to a data network. A geostationary earth orbit (GEO) satellite may be fed by one or several sat-gateways which are deployed across the satellite targeted coverage (e.g. regional or even continental coverage). UE in a cell may be served by only one sat-gateway. A non-GEO satellite may be served successively by one or several sat-gateways at a time. The system may ensure service and feeder link continuity between the successive serving sat-gateways with sufficient time duration to proceed with mobility anchoring and handover.

A feeder link or radio link may be established between a sat-gateway and the satellite (or UAS platform).

A service link or radio link may be established between the user equipment and the satellite (or UAS platform).

A satellite (or UAS platform) may implement either a transparent or a regenerative (with on board processing) payload. The satellite (or UAS platform) may generate several beams over a given service area bounded by a field of view of the satellite. The footprints of the beams (or, beam footprints) may be typically of elliptic shape. The field of view of a satellites (or UAS platforms) may depend on the on board antenna diagram and minimum elevation angle.

A cell of a satellite (e.g., NTN cell) may comprise one or more of all footprints of beams generated by the satellite over a given service area bounded by a field of view of the satellite. The satellite may have/be associated with one or more cells.

A transparent payload may be processed based on radio frequency filtering, frequency conversion and amplification. Hence, the waveform signal repeated by the payload may be un-changed;

A regenerative payload may be processed based on radio frequency filtering, frequency conversion and amplification as well as demodulation/decoding, switch and/or routing, coding/modulation. The processing may be effectively equivalent to having all or part of base station functions (e.g. gNB) on board the satellite (or UAS platform).

Inter-satellite links (ISL) may be established optionally in case of a constellation of satellites. The ISL may require regenerative payloads on board the satellites. ISL may operate in RF frequency or optical bands.

UEs may be served by the satellite (or UAS platform) within the targeted service area.

A service time of a satellite (or, NTN cell) may be a period of time during which a service can be provided by the satellite to a UE via one or more beams in a service area of the satellite (or, in the NTN cell). The service area of the satellite may be bounded by a field of view of the satellite. For example, in idle/inactive mode, a service time of an NTN cell may be a period of time during which a UE can camp on the NTN cell. For another example, in connected mode, a service time of an NTN cell may be a period of time during which a UE can perform a mobility (e.g., handover) and/or random access procedure towards the NTN cell.

The types of satellites (or UAS platforms) are listed in table 7:

TABLE 7

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

GEO satellite and UAS may be used to provide continental, regional or local service. A constellation of LEO and MEO may be used to provide services in both northern and southern hemispheres. In some cases, the constellation can even provide global coverage including polar regions. The constellation may require appropriate orbit inclination, sufficient beams generated and inter-satellite links.

Hereinafter, satellite ephemeris is described.

The ephemeris may be used to describe the location and orbital behaviour of astronomic bodies, including satellites. The ephemeris may be expressed using two-line element (TLE) format. The TLE data format may encode a list of orbital elements of an earth-orbiting object in two 70-column lines. The contents of the TLE table are reproduced in table 8 (i.e., first line of the ephemeris) and 9 (i.e., second line of the ephemeris) below:

TABLE 8

| Field | Columns | Content |
|---|---|---|
| 1 | 01-01 | Line number (1) |
| 2 | 03-07 | Satellite number |
| 3 | 08-08 | Classification (U = Unclassified) |
| 4 | 10-11 | International Designator (Last two digits of launch year) |
| 5 | 12-14 | International Designator (Launch number of the year) |
| 6 | 15-17 | International Designator (piece of the launch) |
| 7 | 19-20 | Epoch Year (last two digits of year) |
| 8 | 21-32 | Epoch (day of the year and fractional portion of the day) |
| 9 | 34-43 | First Time Derivative of the Mean Motion divided by two |
| 10 | 45-52 | Second Time Derivative of Mean Motion divided by six (decimal point assumed) |
| 11 | 54-61 | BSTAR drag term (decimal point assumed) |
| 12 | 63-63 | The number 0 (originally this should have been "Ephemeris type") |
| 13 | 65-68 | Element set number. Incremented when a new TLE is generated for this object. |
| 14 | 69-69 | Checksum (modulo 10) |

TABLE 9

| Field | Columns | Content |
|---|---|---|
| 1 | 01-01 | Line number (2) |
| 2 | 03-07 | Satellite number |
| 3 | 09-16 | Inclination (degrees) |
| 4 | 18-25 | Right ascension of the ascending node (degrees) |
| 5 | 27-33 | Eccentricity (decimal point assumed) |
| 6 | 35-42 | Argument of perigee (degrees) |
| 7 | 44-51 | Mean Anomaly (degrees) |
| 8 | 53-63 | Mean Motion (revolutions per day) |
| 9 | 64-68 | Revolution number at epoch (revolutions) |
| 10 | 69-69 | Checksum (modulo 10) |

The TLE format may be an expression of mean orbital parameters "True Equator, Mean Equinox", filtering out short term perturbations. From its TLE format data, the Simplified General Propagation (SGP) model may be used to calculate the location of the space object revolving about the earth in True Equator Mean Equinox (TEME) coordinate. Then it can be converted into the Earth-Centered, Earth-Fixed (ECEF) Cartesian x, y, z coordinate as a function of time.

Figure 11:
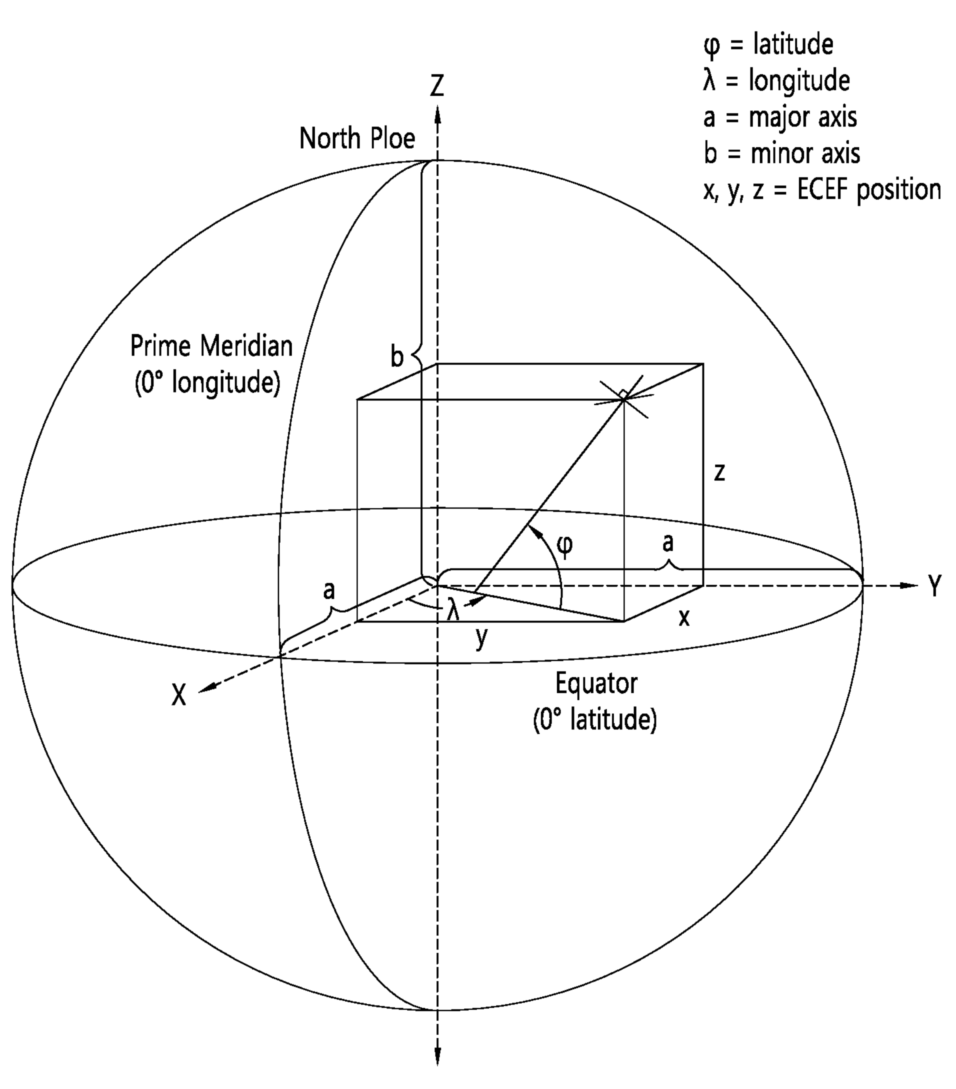
FIG. 11 shows an example of ECEF coordinates in related to latitude and longitude to which implementations of the present disclosure can be applied.

FIG. 11 shows an example of ECEF coordinates in related to latitude and longitude to which implementations of the present disclosure can be applied.

In the ECEF coordinate, z-axis points to the true North, while x axis and y axis intersects 0-degrees latitude and longitude, respectively, as illustrated in FIG. 11.

The instantaneous velocity can also be obtained. An example of ephemeris converted into ECEF format for a satellite is shown in table 10 below:

TABLE 10

| Epoch (day, hr, min, sec) | X[km] | Y[km] | [km] | dX/dt[km/s] | dY/dt[km/s] | dZ/dt [km/s] |
|---|---|---|---|---|---|---|
| 2018 Oct. 26 02:00:00.000 | 19151.529 | −37578.251 | 7.682 | −0.00151 | −0.00102 | −0.00106 |
| 2018 Oct. 26 02:05:00.000 | 19151.073 | −37578.556 | 7.359 | −0.00152 | −0.00101 | −0.00109 |

TABLE 10-continued

| Epoch (day, hr, min, sec) | X[km] | Y[km] | [km] | dX/dt[km/s] | dY/dt[km/s] | dZ/dt [km/s] |
|---|---|---|---|---|---|---|
| 2018 Oct. 26 02:10:00.000 | 19150.614 | −37578.855 | 7.029 | −0.00154 | −0.00099 | −0.00112 |
| 2018 Oct. 26 02:15:00.000 | 19150.150 | −37579.151 | 6.690 | −0.00155 | −0.00098 | −0.00114 |

Given a specific point in time, it is straightforward to calculate the satellite location by interpolation. The example given above refers to a geosynchronous (GEO) satellite, in which the epoch interval is 5 minutes. For LEO satellites, the intervals may be much shorter, on the order of seconds. Meanwhile, in NTN, LEO satellites may revolve around the earth and each LEO satellite may have different orbit and cycle of revolution. Therefore, a LEO satellite may be visible to a UE on the ground during only a specific time period, which can be called service/accessible time period. So even if an NTN cell is measured with a good quality, the cell may disappear soon if the remaining service/accessible time period is not long enough. Therefore, if existing cell selection/reselection mechanism which only relies on cell quality is reused in NTN, it may increase unnecessary cell reselection if remaining service/accessible time of the reselected cell is not enough. As soon as a service/accessible time of the new serving cell expires, the UE should perform cell reselection to another cell. Therefore, timing information-based cell reselection can be considered in NTN cell selection/reselection criteria so that UE can perform cell reselection/reselection to a cell which can provide enough service time to the UE.

For the same purpose, location-based cell selection/reselection can be also considered. Based on the trace of cell coverage, UE may perform cell reselection to a cell such that a distance between the UE and the cell is short because close cell coverage may mean that the cell can provide stable or longer service. However, short distance between UE and cell center does not completely mean that the cell can provide longer service time because, if the cell is getting further from the UE, it is not desirable to perform cell reselection to the cell. In this case, it may be better for the UE to perform cell reselection to a cell to which distance from the UE is longer but which is getting closer to the UE. Thus, in location-based cell reselection criteria, not only distance between UE and cell center but also whether the cell is getting closer or further should be considered.

If time-based condition and location-based condition are both introduced in NTN cell reselection criteria, it should be defined which cell to perform cell reselection to if a cell using time-based condition and a cell using location-based condition are co-deployed in a frequency. For example, how to fairly choose the cell among the cells using time-based condition and location-based condition should be defined.

In the present disclosure, UE may be provided with time condition and/or location condition related to each cell. Based on the time condition and/or location condition, the UE may calculate the remaining service ratio of each cell. The UE may perform a cell reselection to a cell with the highest remaining service ratio. For example, if a service time period is provided, the remaining service ratio may be equal to {remaining time period}/{entire time period}. For example, if the reference distance is provided, the remaining service ratio may be equal to 1) {current distance}/{reference distance} if the cell is getting closer to the UE, or 2) [1−{current distance}/{reference distance}] if the cell is getting further from the UE.

Figure 12:
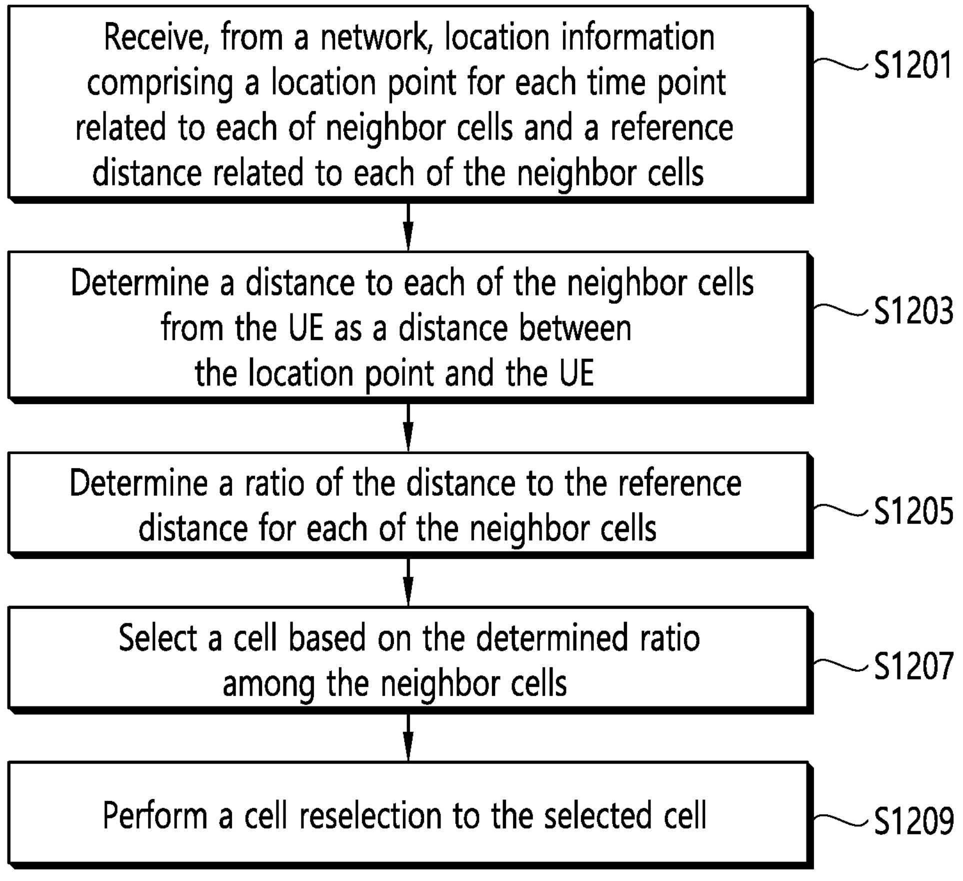
FIG. 12 shows an example of a method performed by a UE in a wireless communication system.

FIG. 12 shows an example of a method performed by a UE in a wireless communication system. The method may also be performed by a wireless device.

Referring to FIG. 12, in step S1201, the UE may receive, from a network, location information comprising a location point for each time point related to each of neighbor cells and a reference distance related to each of the neighbor cells.

In step S1203, the UE may determine a distance to each of the neighbor cells from the UE as a distance between the location point and the UE.

In step S1205, the UE may determine a distance to each of the neighbor cells from the UE as a distance between the location point and the UE.

In step S1207, the UE may select a cell based on the determined ratio among the neighbor cells.

In step S1209, the UE may perform a cell reselection to the selected cell.

According to various embodiments, the location point related to each of the neighbor cells may comprise at least one of a cell center of each of the neighbor cells, or a location of a network node related to each of the neighbor cells.

According to various embodiments, the UE may perform a measurement on each of the neighbor cells to obtain a signal quality of each of the neighbor cells. The UE may determine a cell ranking of each of the neighbor cells based on the signal quality of each of the neighbor cells. The UE may determine the at least one of the neighbor cells based on the cell ranking of each of the neighbor cells.

According to various embodiments, the at least one of the neighbor cells may be determined such that a cell ranking of the at least one of the neighbor cells is above a threshold value configured by the network.

According to various embodiments, the at least one of the neighbor cells may be determined such that a cell ranking of the at least one of the neighbor cells is within a threshold range from a cell ranking of a highest ranked cell among the neighbor cells. The threshold range may be configured by the network.

According to various embodiments, the neighbor cells may comprise target cells for a conditional mobility. Based on that the selected cell is one of the target cells, the UE may perform a conditional mobility to the selected cell based on a mobility command related to the selected cell.

According to various embodiments, the conditional mobility may be performed to the selected cell based on that a mobility condition for the selected cell is satisfied.

According to various embodiments, the conditional mobility may be performed to the selected cell based on that a mobility condition for the selected cell is not satisfied.

According to various embodiments, the UE may determine a remaining service ratio for each of the neighbor cells comprising i) the ratio for a first set of the neighbor cells in a distance decreasing state, and ii) one minus the ratio for a second set of the neighbor cells in a distance increasing state. The UE may select the cell for which the remaining service ratio is highest among the at least one of the neighbor cells. The distance decreasing state may be a state in which a distance to the first set of the neighbor cells from the UE decreases by time. The distance increasing state may be a state in which a distance to the second set of the neighbor cells from the UE increases by time.

According to various embodiments, the distance decreasing state may comprise a time period from a time when the distance between the location point and the UE is maximized, to a time when the distance between the location point and the UE is minimized. The distance increasing state may comprise a time period from a time when the distance between the location point and the UE is minimized, to a time when the distance between the location point and the UE is maximized.

According to various embodiments, the UE may determine a remaining service ratio for each of the neighbor cells comprising a ratio of i) a distance between the location point at a current time and the location point at an initial reference time, to ii) a distance between the location point at a last reference time and the location point at the initial reference time. The UE may select the cell for which the remaining service ratio is highest among the at least one of the neighbor cells. The initial reference time may comprise a time point when the distance between the location point and the UE becomes maximized initially. The last reference time may comprise a time point when the distance between the location point and the UE becomes maximized lastly.

According to various embodiments, each of the neighbor cells may comprise a non-terrestrial network (NTN) cell.

According to various embodiments, the UE may receive a measurement configuration. The measurement configuration may include a cell list with location information of each cell. The UE may calculate distance between UE and cell center of each cell in the cell list whose measured cell quality is higher than a threshold, based on the location information of each cell. The UE may calculate remaining service time ratio based on current distance, reference distance, and current distance range. The UE may perform cell reselection to a neighbor cell whose calculated remaining service ratio is the longest.

Figure 13:
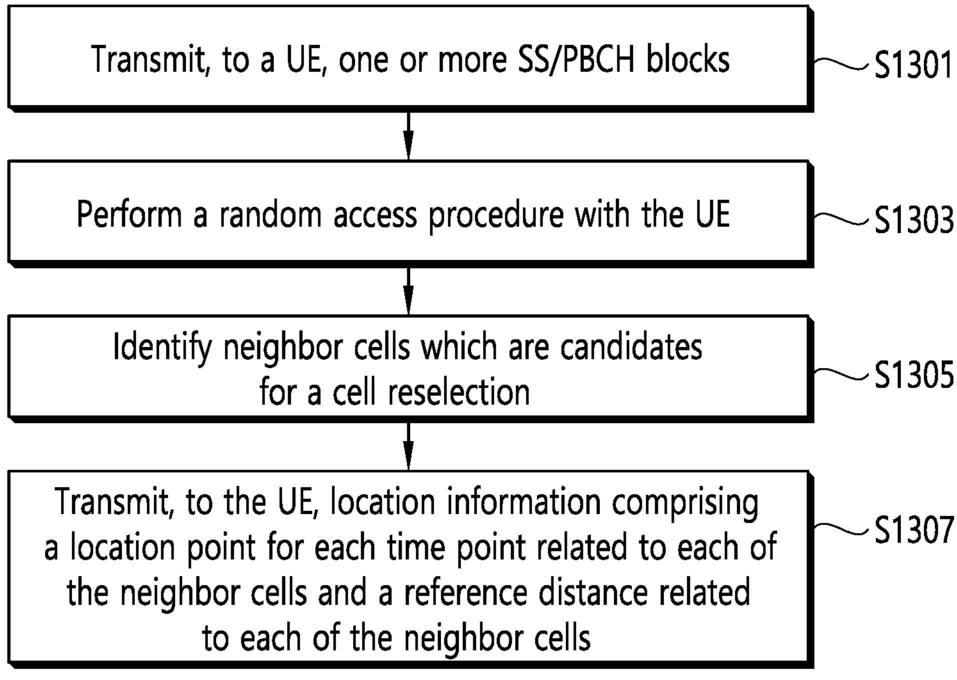
FIG. 13 shows an example of a method performed by a base station (BS) according to an embodiment of the present disclosure.

FIG. 13 shows an example of a method performed by a base station (BS) according to an embodiment of the present disclosure.

Referring to FIG. 13, in step S1301, the BS may transmit, to a UE, one or more SS/PBCH blocks.

In step S1303, the BS may perform a random access procedure with the UE.

In step S1305, the BS may identify neighbor cells which are candidates for a cell reselection.

In step S1307, the BS may transmit, to the UE, location information comprising a location point for each time point related to each of the neighbor cells and a reference distance related to each of the neighbor cells.

In the method, a distance between the location point and the UE is determined as a distance to each of the neighbor cells from the UE. A cell for the cell reselection is selected based on a ratio of the distance to the reference distance for each of the neighbor cells.

Figure 14:
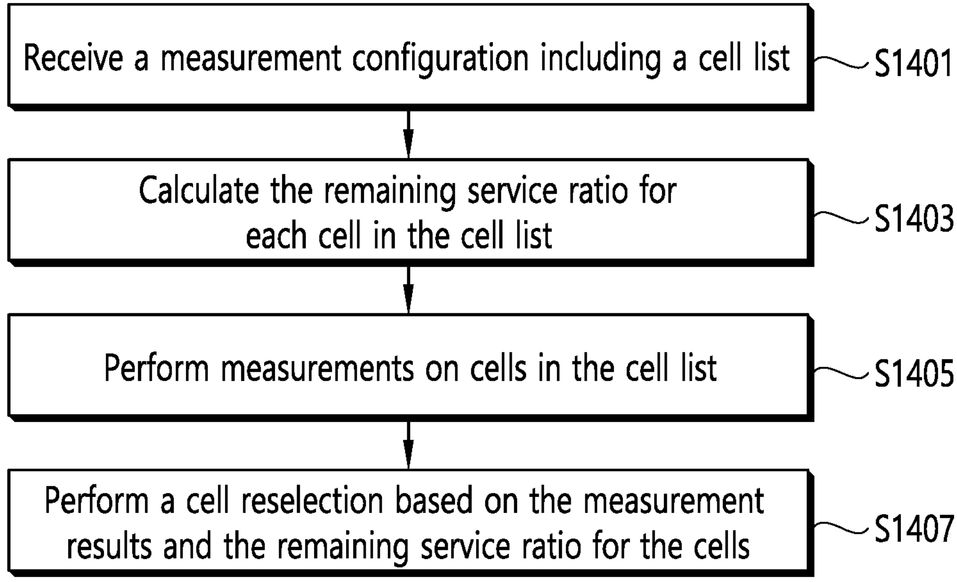
FIG. 14 shows an example of a method for a service ratio-based cell reselection according to an embodiment of the present disclosure.

FIG. 14 shows an example of a method for a service ratio-based cell reselection according to an embodiment of the present disclosure. The method may be performed by a UE and/or a wireless device.

Referring to FIG. 14, in step S1401, the UE may receive a measurement configuration. The measurement configuration may include a frequency list. Each frequency in the frequency list may include a cell list.

For example, each cell in the cell list may include time condition of the cell. The time condition may include an accessible/service time period. The time period may comprise a start time point and/or an end time point.

The start time point and the end time point may be represented by the absolute time (e.g., UTC time). For example, if a start time point is 9:00 UTC and an end time point is 10:00 UTC, then the accessible/service time period may be from 9:00 UTC to 10:00 UTC.

The start time point and the end time point may be represented by a timer. For example, if a start time point is 10 minutes and an end time point is 30 minutes, then the accessible/service time period may be from 10 minutes after a reception of a configuration/information for the timer, to 30 minutes after the reception of a configuration/information for the timer. The UE may start the timer at the start time point, and the timer may run from the start time point to the end time point (i.e., during 20 minutes).

The UE may perform a measurement on a cell during the accessible/service time period of the cell. Based on the measurement results, the UE may be allowed to perform a cell reselection to the cell only within the accessible/service time period.

For example, each cell in the cell list may include a location condition of the cell. The location condition may include location information of a cell reference point by time (i.e., location point for each time point related to each of neighbor cells). The cell reference point may be the cell center or a location of a serving satellite of the cell. Based on the location information of the cell reference point, the UE may be able to calculate a distance between the UE and the cell reference point (e.g., distance between UE and cell center, or distance between UE and serving satellite of the cell).

The location information may comprise a reference distance. The reference distance to a cell may be the longest distance between the UE and the cell when the cell is visible to the UE (i.e., when the UE can access to the cell and/or a service can be provided from the cell to the UE).

The location information may comprise i) satellite position and velocity state vectors, and/or ii) parameters in orbital parameter ephemeris format.

For example, the satellite position and velocity state vectors may comprise at least one of:

position X,Y,Z in ECEF (m); or velocity VX,VY,VZ in ECEF (m/s).

For example, the parameters in orbital parameter ephemeris format may comprise at least one of:

Semi-major axis $\alpha$ [m];

Eccentricity e;

Argument of periapsis $\omega$[rad];

Longitude of ascending node $\Omega$ [rad];

Inclination i [rad]; or

Mean anomaly M [rad] at epoch time.

The cells included in the measurement configuration may comprise neighbour cells in RRC_IDLE/RRC_INACTIVE to perform a cell reselection.

The cells included in the measurement configuration may comprise cell CHO candidate/target cells.

In step S1403, based on the received measurement configuration, the UE may calculate the remaining service ratio of each cell included in the cell list on each frequency in the frequency list.

If a time condition for a cell in the cell list is provided to the UE, then the UE may calculate the remaining service ratio for the cell as "Remaining service ratio={remaining accessible/service time period}/{entire accessible/service time period}".

The remaining accessible/service time period may be a time period between the current time point and the end time point of the accessible/service time period.

For example, if provided accessible time period of a cell is from 9:00 UTC to 9:10 UTC and the current time point is 9:03 UTC, then the remaining accessible/service time period) is 7 minutes (i.e., 9:03 UTC to 9:10 UTC) and the entire accessible/service time period is 10 minutes (i.e., 9:00 UTC to 9:10 UTC). Therefore, the remaining service ratio is 7/10=0.7.

If a location condition for a cell in the cell list is provided to the UE, then the UE may calculate the remaining service ratio for the cell as below:

I. Alternative 1 for Service Ratio Calculation

1) Based on the received location condition, the UE may calculate a distance between the UE and the cell reference point for the cell. The currently calculated distance may be the current distance.
2) If the cell is in a distance decreasing point/range/state, the remaining service ratio for the cell may be {current distance}/{reference distance}.
3) Else if the cell is in a distance increasing point/range/state, the remaining service ratio for the cell may be [1−current distance}/{reference distance} ].

According to various embodiments, the distance decreasing point/range/state may be a state in which the distance between the UE and the cell reference point for the cell decreases by time. The distance decreasing state may comprise a time period from a time when the distance between the UE and the cell reference point for the cell is maximized, to a time when the distance between the UE and the cell reference point for the cell is minimized. The distance increasing point/range/state may be a state in which the distance between the UE and the cell reference point for the cell increases by time. The distance increasing point/range/state may comprise a time period from a time when the distance between the UE and the cell reference point for the cell is minimized, to a time when the distance between the UE and the cell reference point for the cell is maximized.

II. Alternative 2 for Service Ratio Calculation

The remaining service ratio for the cell may be calculated as {distance between the cell reference point for the cell at the current time and the cell reference point for the cell at the initial reference time}/{distance between the cell reference point for the cell at the last reference time and the cell reference point for the cell at the initial reference time}.

According to various embodiments, the initial reference time may be a time point when a distance between the cell reference point for the cell and the UE initially becomes the reference distance. The last reference time may be a time point when a distance between the cell reference point for the cell and the UE lastly becomes the reference distance.

According to various embodiments, the location information may comprise the initial reference time and/or the last reference time.

In step S1405, the UE may perform measurements on the cells included in the measurement configuration. Based on the measurement results, the UE may calculate RSRP, RSRQ, and/or R value for each cell. The R value may be calculated based on the R criteria (i.e., $R_s=Q_{meas,s}+Q_{hyst}-Qoffset_{temp}$, $R_n=Q_{meas,n}-Qoffset-Qoffset_{temp}$).

In step S1407, the UE may perform a cell reselection based on the measurement results, R value and/or the remaining service ratio for the cells.

For example, the UE may perform a cell reselection to a cell for which the remaining service ratio is the highest in the cell list.

For example, in the cell list of a frequency, the UE may select one or more cells whose R value is above a first threshold. Among the selected one or more cells, the UE may perform a cell reselection to a cell for which the remaining service ratio is the highest. The first threshold may be included in the measurement configuration.

For example, in the cell list of a frequency, the UE may select one or more cells whose R value is within a second threshold from the R value of the highest ranked cell on the frequency. Among the selected one or more cells, the UE may perform a cell reselection to a cell for which the remaining service ratio is the highest. The second threshold may be included in the measurement configuration.

Figure 15:
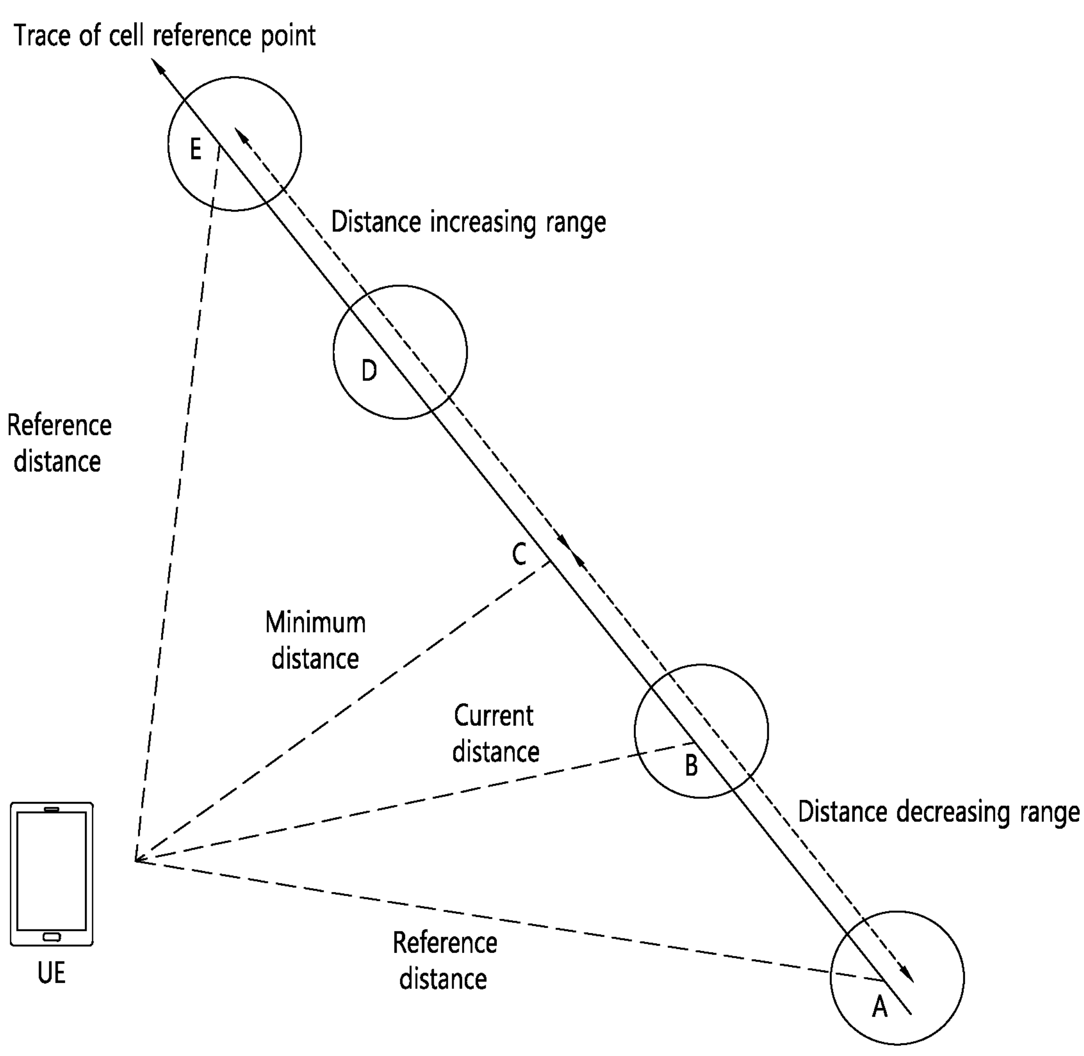
FIG. 15 shows an example of a relative location of a UE and a cell according to an embodiment of the present disclosure.

FIG. 15 shows an example of a relative location of a UE and a cell according to an embodiment of the present disclosure.

In FIG. 15, the change of the current distance (i.e., distance between a cell reference point for the cell and the UE calculated at the current time) while the cell passes near the UE is described. When the cell approaches to the UE, the current distance may approach the reference distance (i.e., point A). Then a distance between the cell reference point and the UE may decrease until the current distance reaches the minimum distance (i.e., point C). After that, now the distance between the cell reference point and the UE may increase and the current distance may reach the reference distance again (i.e., point E).

Thus, the period between the point A and the point C may be a distance decreasing point/range/state.

Thus, the period between the point C and the point E may be a distance increasing point/range/state.

As an alternative 1 of service ratio calculation, during the range from the point A to the point C (i.e., while the current distance may be decreasing or reaching to the minimum distance from the reference distance or while the cell is in the distance decreasing state), the remaining service ratio for the cell may be {current distance}/{reference distance}.

For example, suppose the cell reference point may be at point B in FIG. 15, and the reference distance may be 10 and the current distance at the point B may be 7. Then the remaining service ratio may be equal to 0.7(=7/10).

During the range from the point C to the point E (i.e., while the current distance may be increasing or reaching to the reference distance from the minimum distance, or while the cell is in the distance increasing state), the remaining service ratio may be [1−{current distance}/{reference distance} ].

For example, suppose the cell reference point may be at point D in FIG. 15, and the reference distance may be 10 and the current distance at the point D may be 7. Then, the remaining service ratio may be equal to 0.3(=1−7/10).

As an alternative 2 of service ratio calculation, the remaining service ratio may be {distance between the cell reference point for the cell at the current time and the cell reference point for the cell at the initial reference time}/{distance between the cell reference point for the cell at the last reference time and the cell reference point for the cell at the initial reference time}.

For example, in FIG. 15, the cell reference point for the cell at the initial reference time is on point E, and the cell reference point for the cell at the last reference time is on point A. Then, if the cell reference point for the cell at the current time is on point B, the remaining service ratio may be {distance between the point B and the point E}/{distance between the point A and the point E}.

As an alternative 2 of service ratio calculation, the remaining service ratio may be {distance between a cell reference point at the current time and a cell reference point at which the current distance firstly becomes the reference distance}/{distance between the cell reference point at which the current distance firstly becomes the reference distance and the cell reference point at which the current distance lastly becomes the reference distance}.

For example, in FIG. 15, the cell reference point at which the current distance firstly becomes the reference distance may be point A and the cell reference point at which the current distance lastly becomes the reference distance may be point E. Suppose that the cell reference point at the current time is on point B. Distance between the point A and the point E may be 10, and distance between the point B and the point E may be 7. Then, the remaining service ratio may be $7/10=0.7$.

In the disclosure, the method in perspective of the UE described above in FIG. 12 may be performed by first wireless device 100 shown in FIG. 2, the wireless device 100 shown in FIG. 3, the first wireless device 100 shown in FIG. 4 and/or the UE 100 shown in FIG. 5.

More specifically, the UE may comprise at least one transceiver, at least processor, and at least one computer memory operably connectable to the at least one processor and storing instructions that, based on being executed by the at least one processor, perform operations.

The operations comprise: receiving, from a network, location information comprising a location point for each time point related to each of neighbor cells and a reference distance related to each of the neighbor cells: determining a distance to each of the neighbor cells from the UE as a distance between the location point and the UE: determining a ratio of the distance to the reference distance for each of the neighbor cells: selecting a cell based on the determined ratio among at least one of the neighbor cells: and performing a cell reselection to the selected cell.

In the disclosure, the method in perspective of the UE described above in FIG. 12 may be performed by a software code 105 stored in the memory 104 included in the first wireless device 100 shown in FIG. 4.

More specifically, at least one computer readable medium (CRM) stores instructions that, based on being executed by at least one processor, perform operations comprising: receiving, from a network, location information comprising a location point for each time point related to each of neighbor cells and a reference distance related to each of the neighbor cells: determining a distance to each of the neighbor cells from the UE as a distance between the location point and the UE: determining a ratio of the distance to the reference distance for each of the neighbor cells: selecting a cell based on the determined ratio among at least one of the neighbor cells: and performing a cell reselection to the selected cell.

In the disclosure, the method in perspective of the UE described above in FIG. 12 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus for configured to operate in a wireless communication system (e.g., wireless device) comprises at least processor, and at least one computer memory operably connectable to the at least one processor. The at least one processor is configured to perform operations comprising: receiving, from a network, location information comprising a location point for each time point related to each of neighbor cells and a reference distance related to each of the neighbor cells: determining a distance to each of the neighbor cells from the UE as a distance between the location point and the UE: determining a ratio of the distance to the reference distance for each of the neighbor cells: selecting a cell based on the determined ratio among at least one of the neighbor cells: and performing a cell reselection to the selected cell.

The present disclosure may be applied in perspective of a network node (e.g., base station (BS)) configured to operate in a wireless communication system. The method performed by the network node/BS comprises: transmitting, to a user equipment (UE), one or more synchronization signal/physical broadcast channel (SS/PBCH) blocks: performing a random access procedure with the UE: identifying neighbor cells which are candidates for a cell reselection: and transmitting, to the UE, location information comprising a location point for each time point related to each of the neighbor cells and a reference distance related to each of the neighbor cells. A distance between the location point and the UE may be determined as a distance to each of the neighbor cells from the UE. A cell for the cell reselection may be selected based on a ratio of the distance to the reference distance for each of the neighbor cells.

In the disclosure, the method in perspective of the network node described above may be performed by second wireless device 100 shown in FIG. 2, the device 100 shown in FIG. 3, and/or the second wireless device 200 shown in FIG. 4.

More specifically, the network node comprises at least one transceiver, at least processor, and at least one computer memory operably connectable to the at least one processor and storing instructions that, based on being executed by the at least one processor, perform operations.

The operations comprise: transmitting, to a user equipment (UE), one or more synchronization signal/physical broadcast channel (SS/PBCH) blocks: performing a random access procedure with the UE: identifying neighbor cells which are candidates for a cell reselection: and transmitting, to the UE, location information comprising a location point for each time point related to each of the neighbor cells and a reference distance related to each of the neighbor cells. A distance between the location point and the UE may be determined as a distance to each of the neighbor cells from the UE. A cell for the cell reselection may be selected based on a ratio of the distance to the reference distance for each of the neighbor cells. The present disclosure can have various advantageous effects.

For example, the UE can expect which cell can provide the longest service time based on provided time condition or location condition. If the longer service time is provided, the UE can avoid unnecessary mobility.

For example, when time condition/location condition is provided to UE, the UE can perform a cell reselection/mobility to a cell in which a service is provided to the UE longest.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

receiving, by a user equipment (UE) from a network via a serving cell, location information comprising location points related to each of neighbor cells for the serving cell, and a reference distance related to each of the neighbor cells, wherein each of the location points is related to a corresponding time point;

determining, by the UE for each of the neighbor cells, a distance between a location point related to a corresponding neighbor cell for a current time point, and the UE;

determining, by the UE for each of the neighbor cells, a remaining service ratio based on a ratio of the distance to the reference distance, wherein the remaining service ratio is i) the ratio of the distance to the reference distance for a first set of the neighbor cells to which distance from the UE decreases by time, and ii) one minus the ratio of the distance to the reference distance for a second set of the neighbor cells to which distance from the UE increases by time; and performing, by the UE, a cell reselection to a neighbor cell for which the remaining service ratio is highest among the neighbor cells.

2. The method of claim 1, wherein a location point of the neighbor cell among the neighbor cells comprises at least one of a cell center of the neighbor cell, or a location of a network node related to the neighbor cell.

3. The method of claim 1, further comprising:

performing, by the UE, a measurement on each of the neighbor cells to obtain a signal quality of each of the neighbor cells;

determining, by the UE, a cell ranking of each of the neighbor cells based on the signal quality of each of the neighbor cells; and determining, by the UE, one or more neighbor cells based on the cell ranking of each of the neighbor cells, wherein the cell reselection is performed among the one or more neighbor cells.

4. The method of claim 3, wherein the one or more neighbor cells are determined such that a cell ranking of the one or more neighbor cells is above a threshold value configured by the network.

5. The method of claim 3, wherein the one or more neighbor cells are determined such that a cell ranking of the one or more neighbor cells is within a threshold range from a cell ranking of a highest ranked cell among the neighbor cells, and wherein the threshold range is configured by the network.

6. The method of claim 1, wherein the neighbor cells comprise target cells for a conditional mobility, and wherein the performing of the cell reselection to the neighbor cell comprises based on the neighbor cell being one of the target cells, performing a conditional mobility to the neighbor cell.

7. The method of claim 6, wherein the conditional mobility is performed to the neighbor cell based on a mobility condition for the neighbor cell being satisfied.

8. The method of claim 6, wherein the conditional mobility is performed to the neighbor cell based on a mobility condition for the neighbor cell being not satisfied.

9. The method of claim 1, wherein each of the neighbor cells comprises a non-terrestrial network (NTN) cell.

10. The method of claim 1, wherein the UE is in communication with at least one of a mobile device, a network, or autonomous vehicles.

11. A user equipment (UE) comprising:

at least one transceiver;

at least one processor; and at least one computer memory operably connectable to the at least one processor and storing instructions that, based on being executed by the at least one processor, perform operations comprising:

receiving, from a network via a serving cell, location information comprising location points related to each of neighbor cells for the serving cell, and a reference distance related to each of the neighbor cells, wherein each of the location points is related to a corresponding time point;

determining, for each of the neighbor cells, a distance between a location point related to a corresponding neighbor cell for a current time point, and the UE;

determining, for each of the neighbor cells, a remaining service ratio based on a ratio of the distance to the reference distance, wherein the remaining service ratio is i) the ratio of the distance to the reference distance for a first set of the neighbor cells to which distance from the UE decreases by time, and ii) one minus the ratio of the distance to the reference distance for a second set of the neighbor cells to which distance from the UE increases by time; and performing a cell reselection to a neighbor cell for which the remaining service ratio is highest among the neighbor cells.

* * * * *